United States Patent [19]

Saiki et al.

[11] Patent Number: 5,631,060
[45] Date of Patent: May 20, 1997

[54] RESIN MOLDED ARTICLE HAVING A MOVABLE PROJECTING PORTION

[75] Inventors: Noritsugu Saiki, Midori-ku; Yoshihiro Akiba, Tokyo; Sakae Shimotsuma, Atsugi, all of Japan

[73] Assignee: Teijin Limited, Osaka, Japan

[21] Appl. No.: 597,933

[22] Filed: Feb. 7, 1996

[30] Foreign Application Priority Data

Feb. 8, 1995 [JP] Japan ................... 7-020492

[51] Int. Cl.$^6$ ................... G06C 7/02
[52] U.S. Cl. ................... 428/101; 428/156; 235/145 R
[58] Field of Search ................... 428/101, 156; 235/145 R

[56] References Cited

U.S. PATENT DOCUMENTS 5,011,728  4/1991  Imae ................... 428/156

*Primary Examiner*—Patricia A. Short
*Attorney, Agent, or Firm*—Sherman and Shalloway

[57] ABSTRACT

A resin molded article having a moveable projecting portion suitable for use in forming a keyboard or keyboard switch and which is substantially free from flex fatigue. At least the moveable projecting portion of the molded article is formed from a resin composition containing a polyether ester block copolymer and a small amount of an alkali metal salt of an aliphatic carboxylic acid having 10 to 36 carbon atoms. The polyether ester block copolymer contains units from terephthalic acid, tetramethylene glycol and polyoxytetramethylene glycol. The resin molded article includes a thick projecting (moveable) portion, a base portion and a flexible thin side portion connecting the thick projecting portion to the base portion. The side portion has a thickness of 0.05 to 0.5 mm and a flexibility retention of at least 85%.

9 Claims, 1 Drawing Sheet

RESIN MOLDED ARTICLE HAVING A MOVABLE PROJECTING PORTION

DETAILED DESCRIPTION OF THE INVENTION

This invention relates to a resin molded article having a movable projecting portion. More specifically, it relates to a resin molded article having a movable projecting portion almost free from flex fatigue, which is used in a keyboard for pocket-sized calculators.

In recent years, the consumption of thermoplastic elastomers has been increasing because of their good moldability. Among them, elastomers essentially composed of terephthalic acid, tetramethylene glycol and polyoxytetramethylene glycol, which are known as polyester elastomers, are used for various applications, making use of their excellent properties such as heat resistance and cold resistance.

Meanwhile, it is well known that use of polyester elastomers as a keyboard switch is studied due to its excellent press touch obtained when one depresses a key, in addition to its good moldability.

However, there is indicated the possibility that, when a block copolymer of polytetramethylene glycol and polybutylene terephthalate, a typical example of the polyester elastomer, is used in a keyboard switch which needs to withstand repetitions of bending and returning, settling occurs and flexibility is lost and, in extreme cases, a short circuit occurs between contact points, thereby making the keyboard switch unusable.

It is therefore an object of the present invention to provide a resin molded article having a movable projecting portion, which is made of a specific elastomer, for use such as a keyboard switch.

Another object of the present invention is to provide a resin molded article having a movable projecting portion which is almost free from flex fatigue.

Other objects and advantages of the present invention will become apparent from the following description and accompanying drawings.

Figure 1:
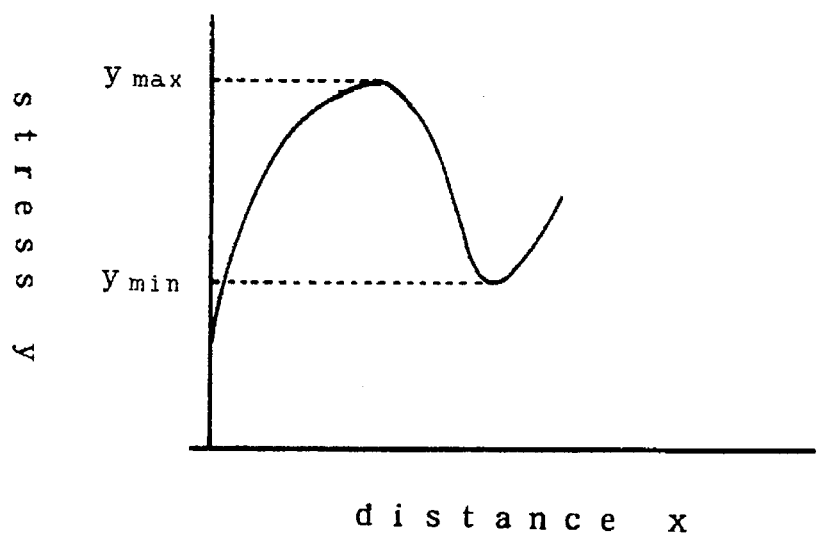
FIG. 1 is a graph of the typical relationship between the falling distance x of the projecting portion of the resin molded article of this invention and the stress y applied to the projecting portion when the projecting portion is depressed from above at a speed of 5 mm/min.

Firstly, according to the present invention, the above objects and advantages can be accomplished by a resin molded article having a movable projecting portion, which is formed of a resin composition comprising (i) 100 parts by weight of a polyether ester block copolymer which comprises terephthalic acid, tetramethylene glycol and polyoxytetramethylene glycol and (ii) 0.6 to 5 parts by weight of an alkali metal salt of an aliphatic carboxylic acid having 10 to 36 carbon atoms, and which has the thick projecting portion, a base portion and a thin side portion which is provided around the thick projecting portion for connecting the thick projecting portion to the base portion, has a thickness of 0.05 to 0.5 mm and shows a flexibility retention of at least 85%.

The polyether ester block copolymer constituting the resin molded article of the present invention is essentially composed of terephthalic acid, tetramethylene glycol and polyoxytetramethylene glycol.

The polyether ester block copolymer can be obtained by thermally polycondensing terephthalic acid or an ester forming derivative thereof, tetramethylene glycol or an ester forming derivative thereof, and polyoxytetramethylene glycol or an ester forming derivative thereof. The polyether ester block copolymer contains polyoxytetramethylene glycol preferably in an amount of 50% or more by weight, more preferably more than 60% and 80% or less by weight.

It is desirable that the polyether ester block copolymer should contain terephthalic acid preferably in an amount of at least 70 mol %, more preferably at least 80 mol %, of the dicarboxylic acid component, and tetramethylene glycol preferably in an amount of at least 70 mol %, more preferably at least 80 mol %, of the diol component.

Illustrative examples of the dicarboxylic acid other than terephthalic acid include aromatic dicarboxylic acids such as isophthalic acid, phthalic acid and naphthalene dicarboxylic acid; aliphatic dicarboxylic acids such as adipic acid and sebacic acid; alicyclic dicarboxylic acids such as cyclohexane dicarboxylic acid; and the like.

Illustrative examples of the diol other than tetramethylene glycol include aliphatic diols such as ethylene glycol and hexamethylene glycol; alicyclic diols such as cyclohexane dimethanol; aromatic diols such as 2,2-bis(4-hydroxyphenyl)propane and hydroquinone; and the like.

It is desirable that a dicarboxylic acid other than terephthalic acid as listed above and a diol other than tetramethylene glycol as listed above should be copolymerized preferably in an amount of 30 mol % or less, more preferably 20 mol % or less based on the dicarboxylic acid component. If the proportion of each of these third components is larger than 30 mol %, the resulting polymer has a low melting point and sticking during molding disadvantageously. However, if the third components are copolymerized in a small amount, namely 10 mol % or less, the transparency of the resulting polymer is high advantageously in many cases.

What has a number average molecular weight of 500 to 3,000 is preferably used as the polyoxytetramethylene glycol. The number average molecular weight of 1,000 to 2,000 is more preferable.

The above polyether ester block copolymer used in the present invention may be produced by a known method.

The resin composition constituting the resin molded article of the present invention further contains an alkali metal salt of an aliphatic carboxylic acid. The aliphatic carboxylic acid has 10 to 36 carbon atoms. The aliphatic carboxylic acid may be saturated or unsaturated, and straight-chain or branched-chain.

Preferred examples of the aliphatic carboxylic acid include aliphatic monocarboxylic acids such as capric acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid.

Preferred examples of the alkali metal salt of the carboxylic acid as listed above include sodium salts, potassium salts and the like.

The alkali metal salt of the aliphatic carboxylic acid is particularly preferably a sodium salt of an aliphatic monocarboxylic acid.

The alkali metal salt of the carboxylic acid is used in an amount of 0.6 to 5 parts by weight, preferably 1 to 3 parts by weight based on 100 parts by weight of the polyether ester block copolymer.

The above resin composition may contain a stabilizer, release agent, plasticizer and the like as required.

Illustrative examples of the stabilizer include steric hindrance phenols commonly used as thermal stabilizers, such as Irganox 245, 259, 565, 1010, 1035, 1076, 1098, 1222, 1330, 3114 and the like manufactured by Ciba Geigy Co.

The stabilizer is used preferably in an amount of 0.1% or more by weight, more preferably 0.5% to 5% by weight. If the amount is too small, the effect of improving stability is small, and if the amount is too large, not only there is no increase in the effect of improving stability but also bleed-out to the surface and a reduction in strength occur disadvantageously.

As the plasticizer, aromatic polyvalent carboxylic acid ester-based plasticizers are preferably used. The plasticizer is used preferably in an amount of 2 to 50% by weight, more preferably 5 to 30% by weight. If the amount is smaller than 2%, the effect is small, and if the amount is larger than 50%, the resulting composition may become too soft or the additive may bleed out disadvantageously.

The alkali metal salt of the carboxylic acid may be mixed in any stage before a molded article is produced from the resulting resin composition comprising the polyether ester block copolymer. Therefore, mixing methods for the alkali metal salt include addition in the polymerization stage, melting and kneading with an extruder, addition during molding and mixing simultaneously with molding, and the like.

The resulting composition is molded into a resin molded article of the present invention by regular melt molding, such as injection molding. During this molding, the mold temperature is preferably 20° to 60° C., more preferably 30° to 50° C. If the mold temperature is above 60° C. or below 20° C., the flex durability of the thus obtained molded article lowers or flexibility deteriorates disadvantageously.

The resin molded article of the present invention consists of (1) a thick projecting portion, (2) a base portion and (3) a flexible thin side portion.

The side portion (3) is a portion for connecting the thick projecting portion (1) to the base portion (2) and provided around the thick projecting portion (1). The thick projecting portion, the base portion and the thin side portion are preferably molded into an integrated unit.

The thin side portion needs to have a thickness of 0.05 to 0.5 mm. If the thickness is smaller than 0.05 mm, the thin side portion is too much flexible to be used. If the flexibility retention is less than 85%, flexibility is insufficient due to a long time of use, thereby making the molded article out of practical use.

If the thickness is larger than 0.5 mm, sufficient flexibility cannot be obtained and the object of the present invention cannot be achieved.

Preferably, the thin side portion has a thickness of 0.07 to 0.3 mm.

In the present invention, the thin side portion has a flexibility retention of at least 85%.

The flexibility retention is measured and defined as follows. The projecting portion is depressed from above at a speed of 5 mm/min and the relationship between the falling distance x of the projecting portion and stress y applied to the projecting portion is obtained.

This relationship is typically shown in FIG. 1.

The above relationship is obtained before and after 50,000 cycles of depressing and releasing the projecting portion at a speed of 5 cycles per second.

The ratio of the maximum stress $y_{max}$ to the minimum stress $y_{min}$ ($y_{max}/y_{min}$) is obtained and the relationship before the cycles is represented by $(y_{max}/y_{min})_{init}$.

Similarly, the ratio $y_{max}/y_{min}$ is obtained and the relationship after 50,000 cycles is represented by $(y_{max}/y_{min})_{final}$.

The flexibility retention (%) is defined by the following expression.

$$\frac{(y_{max}/y_{min})_{final}}{(y_{max}/y_{min})_{init}} \times 100 \ (\%)$$

The flexibility retention is preferably at least 87%, more preferably at least 89%.

The term "flexibility" as used herein means the abrupt transformation or curving-in of the side portion by a certain limit of force ($y_{max}$) when the projecting portion is depressed from above, which causes the projecting portion to pop down. Therefore, the projecting portion pops up and down by repeating this transformation or curving-in of the side portion.

In the molded article of the present invention, the projecting portion can have a thickness of about 1 to 20 mm, the height from the top of the base portion to the top of the projecting portion can be about 1.4 to 22 mm, and further the angle of the side portion with respect to the base portion can be about 30° C. to 60° C.

The molded article of the present invention is preferably used as a switch for a keyboard, for example.

The following examples are given to further illustrate the present invention. "Parts" in the examples means parts by weight.

EXAMPLE 1

(1) 31 parts of dimethyl terephthalate, 23 parts of tetramethylene glycol and 64 parts of polyoxytetramethylene glycol having an average molecular weight of 2,000 were subjected to an ester interchange reaction by a commonly used method and then to a polymerization reaction under reduced pressure. A block copolymer having a viscosity measured at 35° C. in orthochlorophenol of 1.32 was obtained. To 100 parts of this polyester was added 2 parts of sodium palmitate and 1 part of pentaerythrithyl-tetrakis(3-(3,5-di-t-butyl-4-hydroxyphenyl)propionate) to obtain a composition.

(2) From this composition was molded a 2 mm thick No.3 dumbbell based on JIS K6301 at a cylinder temperature of 250° C. and a mold temperature of 40° C. This dumbbell was kept upright and stretched and a flex test was repeated 100,000 times that a hold portion and an intermediate section of a stretched portion of the dumbbell were made so close to each other that they were almost contacted with each other. After the completion of this flex test, the dumbbell was taken out and placed on the desk with the hold portion positioned at the bottom and the height from the bottom to the top of the bent dumbbell was measured. It was found to be 6 mm.

After the dumbbell was left at room temperature for 3 days, the height was measured. It was found to be 3 mm.

(3) Meanwhile, from the above composition was injection molded a resin molded article for use as a keyboard switch in which a round projecting portion having a diameter of 7 mm is connected to a base portion through a side portion having a vertical thickness of 0.2 mm and a height of 1 mm. A conductive coating was applied to the rear side of the projecting portion so that the projecting portion became conductive when depressed. Thereafter, a test that the projecting portion was depressed 1 million times was conducted. All the ten projecting portions did not become conductive when they were released.

Figure 2:
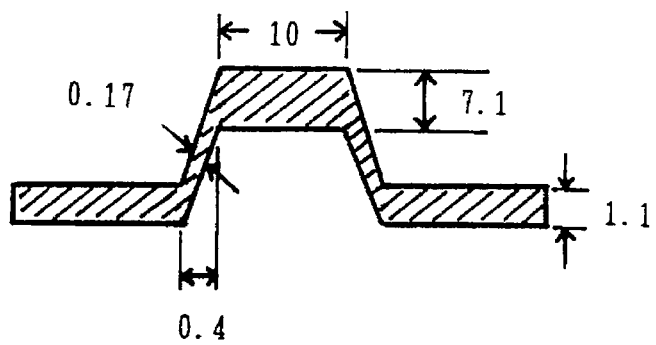
FIG. 2 is a side elevation view of an embodiment of a resin molded article according to the invention.

(4) From the above composition was injection molded a resin molded article having a section shown in FIG. 2 in which a round projecting portion having a diameter of 10 mm was connected to a base portion through a thin side portion having a thickness of 0.17 mm, a height from the top of the base portion to the top of the projecting portion of 0.7 mm and an angle formed by it and the base portion of 45°. $(y_{min}/y_{max})$init and $(y_{min}/y_{max})$final of this molded article were obtained and its flexibility retention was calculated from these values. Results are shown in Table 1.

Comparative Example 1

A molded sample was prepared in the same manner as in Example 1 except that sodium palmitate was not added in EXAMPLES 4 to 6

Samples were prepared in the same manner as in Example 1 except that the amount of sodium palmitate was changed as shown in Table 1. Results are shown in Table 1.

The resin molded article of the present invention has a movable projecting portion which is almost free from flex fatigue and is provided as a transparent article because the resin composition is transparent. Since the resin composition in the present invention has excellent moldability, a resin molded article can be molded easily and efficiently from the resin composition.

TABLE 1

| | Additive | | Height (mm) | | | | Transformation |
|---|---|---|---|---|---|---|---|
| | Type | Amount | After flex test | 3 days after | $(y_{max}/y_{min})_{init}$ | $(y_{max}/y_{min})_{final}$ | Retention (yo) |
| Example 1 | sodium palmitate | 2 | 6 | 3 | 1.28 | 1.18 | 92 |
| Example 2 | sodium montanate | 2 | 6 | 3 | 1.27 | 1.19 | 94 |
| Example 3 | sodium palmitate | 2 | 5 | 2 | 1.19 | 1.08 | 91 |
| Example 4 | sodium paltimate | 1 | 6.5 | 3.3 | 1.30 | 1.16 | 89 |
| Example 5 | same as above | 0.7 | 7 | 3.7 | 1.37 | 1.18 | 89 |
| Example 6 | same as above | 0.4 | 9 | 5 | 1.33 | 1.14 | 86 |
| Comparative Example 1 | — | — | 11 | 9 | 1.32 | 1.09 | 83 |
| Comparative Example 2 | — | — | 9 | 8 | 1.23 | $y_{max}$ doesn't appear | — |

Example 1 (1) and (2), and a flex test was made on the sample. The sample which was subjected to 100,000 cycles of the flex test was placed on the desk and measured for its height. The height was found to be 11 mm, and 9 mm after it was left for 3 days.

Compared with Example 1, immediately after the flex test and after the sample was left, its bent angle was large and its returnability to original form was low.

Like Example 1 (3), the sample was subjected to the test that the projecting portion was depressed 1 million times as a keyboard switch and 3 out of the ten projecting portions were kept conductive.

The flexibility retention obtained in the same manner as in Example 1 (4) is shown in Table 1.

EXAMPLE 2

A sample was prepared in the same manner as in Example 1 except that sodium montanate and sodium stearate were used in place of sodium palmitate. The height of the sample after 100,000 cycles of the flex test as in Example 1 (2) and the height 3 days after the test were measured. Results are shown in Table 1. The flexibility retention obtained in the same manner as in Example 1 (4) is shown in Table 1.

EXAMPLE 3

A sample was prepared in the same manner as in Example 1 except that Adecasizer C-8 (manufactured by Asahi Denka Kogyo Co.) was added in an amount of 15% as a plasticizer and tested. Results are shown in Table 1.

Comparative Example 2

A sample was prepared in the same manner as in Example 3 except that sodium palmitate was not used. Results are shown in Table 1.

What is claimed is:

1. A resin molded article having a movable projecting portion, which is formed of a resin composition comprising
    (i) 100 parts by weight of a polyether ester block copolymer which comprises terephthalic acid, tetramethylene glycol and polyoxytetramethylene glycol and
    (ii) 0.6 to 5 parts by weight of an alkali metal salt of an aliphatic carboxylic acid having 10 to 36 carbon atoms, and which has the thick projecting portion, a base portion and a flexible thin side portion provided around the thick projecting portion for connecting the thick projecting portion to the base portion, the side portion having a thickness of 0.05 to 0.5 mm and showing a flexibility retention of at least 85%.

2. The resin molded article of claim 1, wherein the polyether ester block copolymer contains 50% or more by weight of polymer units of polyoxytetramethylene glycol.

3. The resin molded article of claim 2, wherein the polyoxytetramethylene glycol has a number average molecular weight of 500 to 3,000.

4. The resin molded article of claim 1, wherein the alkali metal salt of the aliphatic carboxylic acid is a sodium salt of an aliphatic monocarboxylic acid.

5. The resin molded article of claim 1, which is formed of the resin composition containing 1 to 3 parts by weight of the alkali metal salt of the aliphatic carboxylic acid.

6. The resin molded article of claim 1, whose thick projecting portion, thin side portion and base portion are molded into an integrated unit.

7. The resin molded article of claim 1, whose flexible thin side portion has a thickness of 0.07 to 0.3 mm.

8. A keyboard having the resin molded article of claim 1.

9. A resin molded article having a moveable projecting portion wherein said article is formed by molding a resin composition formed by mixing (i) 100 parts by weight of a polyether ester block copolymer which comprises terephthalic acid, tetramethylene glycol and polyoxytetramethylene glycol and (ii) 0.6 to 5 parts by weight of an alkali metal salt of an aliphatic carboxylic acid having 10 to 36 carbon atoms, and which has a thick projecting portion, a base portion and a flexible thin side portion provided around the thick projecting portion for connecting the thick portion to the base portion, the side portion having a thickness of 0.05 to 0.5 mm and a flexibility retention of at least 85%.

* * * * *